(12) United States Patent
Jensen et al.

(10) Patent No.: US 11,768,587 B2
(45) Date of Patent: Sep. 26, 2023

(54) ELECTRONIC TRANSACTION ACTIVATED AUGMENTED REALITY EXPERIENCES

(71) Applicant: Snap Inc., Santa Monica, CA (US)

(72) Inventors: John Jensen, Santa Monica, CA (US); Gabriel Lupin, Marina del Rey, CA (US); Jialu Zhao, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 104 days.

(21) Appl. No.: 17/400,394

(22) Filed: Aug. 12, 2021

(65) Prior Publication Data

US 2022/0187964 A1 Jun. 16, 2022

Related U.S. Application Data

(60) Provisional application No. 63/124,234, filed on Dec. 11, 2020.

(51) Int. Cl.

| | | |
|---|---|---|
| *G06F 3/048* | (2013.01) | |
| *G06F 3/0484* | (2022.01) | |
| *G06F 3/0482* | (2013.01) | |
| *G06T 11/00* | (2006.01) | |
| *G06Q 20/38* | (2012.01) | |
| *G06F 16/903* | (2019.01) | |
| *G06F 3/0346* | (2013.01) | |

(52) U.S. Cl.
CPC .......... *G06F 3/0484* (2013.01); *G06F 3/0346* (2013.01); *G06F 3/0482* (2013.01); *G06F 16/90335* (2019.01); *G06Q 20/38* (2013.01); *G06T 11/00* (2013.01); *G06T 2200/24* (2013.01)

(58) Field of Classification Search
CPC .... G06F 3/0484; G06F 3/0346; G06F 3/0482; G06F 16/90335; G06F 3/011; G06Q 20/38; G06T 11/00; G06T 2200/24; G06T 11/60
See application file for complete search history.

(56) References Cited

U.S. PATENT DOCUMENTS

| | | | |
|---|---|---|---|
| 2016/0196052 A1* | 7/2016 | Franklin | ............... G06F 3/0481 |
| | | | 715/765 |
| 2021/0060439 A1* | 3/2021 | Beran | ..................... A63F 13/69 |

OTHER PUBLICATIONS

Wagner (https://www.vox.com/2015/11/13/11620654/snapchat-tries-another-way-to-make-money-more-in-app-purchases, 2015, attached as pdf) (Year: 2015).*

(Continued)

*Primary Examiner* — Aleksey Olshannikov
(74) *Attorney, Agent, or Firm* — Schwegman Lundberg & Woessner, P.A.

(57) ABSTRACT

Aspects of the present disclosure involve a system and a method for performing operations comprising: receiving, by a client device implementing a messaging application, a request to access a display of a plurality of augmented reality experiences; retrieving a plurality of identifiers of each of the plurality of augmented reality experiences; determining that a given augmented reality experience of the plurality of augmented reality experiences is associated with an access restriction; modifying a given identifier of the plurality of identifiers associated with the given augmented reality experience in response to determining that the given augmented reality experience is associated with the access restriction; and generating, for display on the client device, a graphical user interface that includes the plurality of identifiers comprising the modified given identifier.

20 Claims, 16 Drawing Sheets

(56) References Cited

OTHER PUBLICATIONS

"International Application Serial No. PCT/US2021/062397, International Search Report dated Mar. 14, 2022", 3 pgs.
"International Application Serial No. PCT/US2021/062397, Written Opinion dated Mar. 14, 2022", 7 pgs.
"How to find filters on Instagram?! Search awesome Instagram Stories filters", [Online] Retrieved from the Internet: <URL: https://www.youtube.com/watch?v=4G5Klb1894o>, [Retrieved on Mar. 2, 2022], (Jan. 31, 2020), 7 pgs.

* cited by examiner

ELECTRONIC TRANSACTION ACTIVATED AUGMENTED REALITY EXPERIENCES

CLAIM OF PRIORITY

This application claims the benefit of priority to U.S. Provisional Application Ser. No. 63/124,234, filed Dec. 11, 2020, which is incorporated herein by reference in its entirety.

TECHNICAL FIELD

The present disclosure relates generally to providing graphical elements using a messaging application.

BACKGROUND

Modern day user devices provide messaging applications that allow users to exchange messages with one another. Such messaging applications have recently started incorporating graphics in such communications. Users can select between various predetermined graphics to incorporate into their communications.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
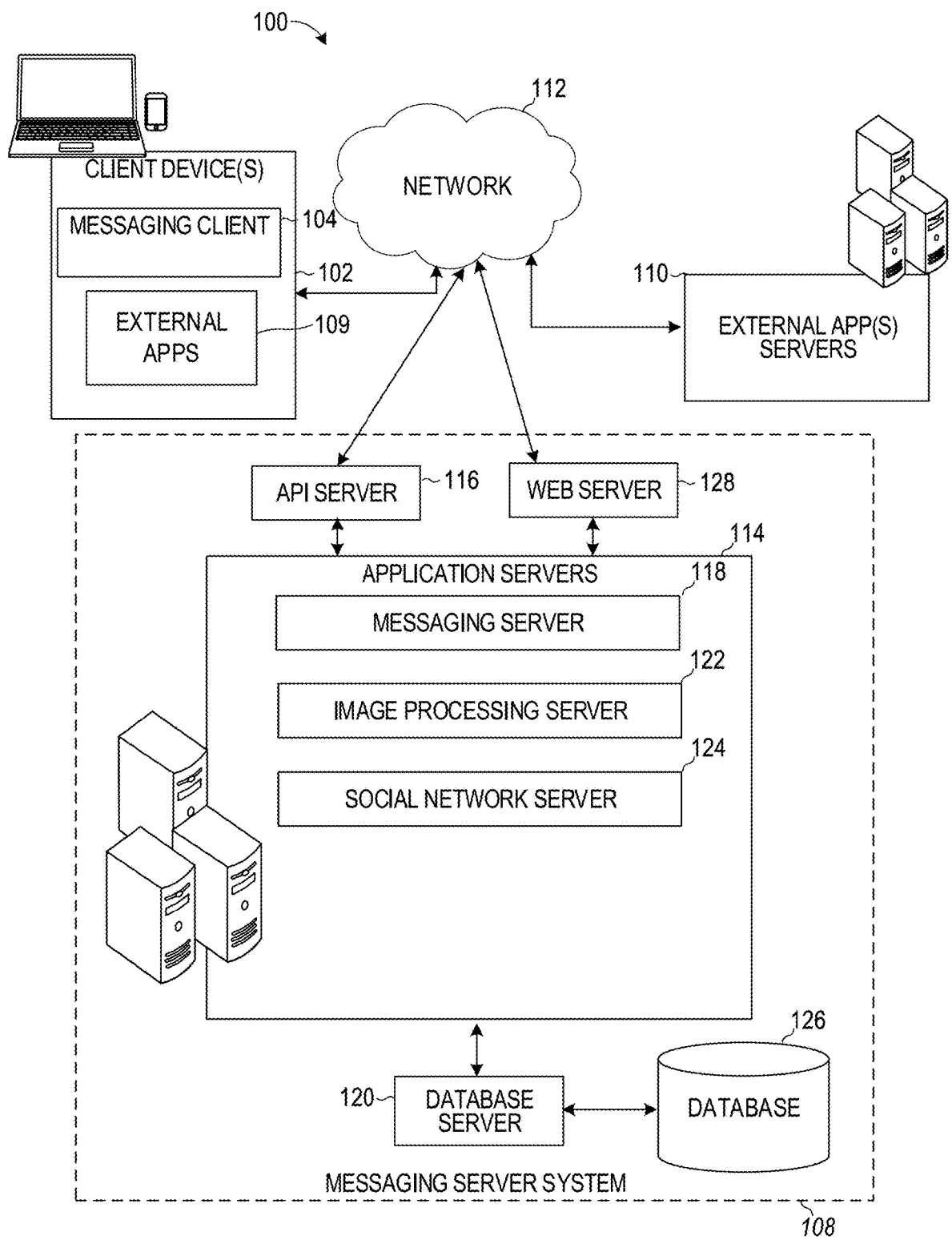
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications allow users to select from a predefined list of images to send to one another. Users are increasingly communicating with each other using such images to convey their thoughts. However, finding the right images to convey a particular thought can be tedious and time consuming. Specifically, the user has to manually search using keywords for a particular image that conveys a given message. This requires navigating through multiple pages of information until the desired image is found. Given the complexity and amount of time it takes to find the right image, users become discouraged from communicating using the images, which results in a waste of resources or lack of use.

The disclosed embodiments improve the efficiency of using the electronic device by providing a system that presents augmented reality experiences for a user to use to augment a captured image or video to be shared with another user in a messaging application. The disclosed embodiments provide a user interface that makes it easy for a user to locate an augmented reality experience to use and select to augment a captured image or video. Certain augmented reality experiences can be premium experience that includes specialized collection of augmented reality items or features. The user's attention can be directed to such premium experiences by displaying identifiers of such experiences in a modified or different manner than identifiers of non-premium experiences. In some implementations, the premium augmented reality experiences are associated with access restrictions. In such circumstances, the disclosed embodiments provide an efficient and intuitive user interface for removing such access restrictions and previewing such premium experiences.

According to the disclosed embodiments, a messaging application implemented by one or more processors of a client device receives request to access a display of a plurality of augmented reality experiences. In response, the messaging application retrieves a plurality of identifiers of each of the plurality of augmented reality experiences and determines that a given augmented reality experience of the plurality of augmented reality experiences is associated with an access restriction. In response, the messaging application modifies a given identifier of the plurality of identifiers associated with the given augmented reality experience and generates, for display on the client device, a graphical user interface that includes the plurality of identifiers comprising the modified given identifier.

In this way, the disclosed embodiments improve the efficiency of using the electronic device by reducing the number of screens and interfaces a user has to navigate through to find an augmented reality item to augment an image captured by the user to then share with other users. This reduces the device resources (e.g., processor cycles, memory, and power usage) needed to accomplish a task with the device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience. Launching the augmented reality experience includes obtaining one or more augmented reality items associated with the augmented reality experience and overlaying the augmented reality items on top of the images or video being presented.

In one embodiment, the augmented reality items move around or track a real-world object that is depicted. For example, the augmented reality items may be makeup items that are placed on a real-world face that is depicted. As the face moves around, accelerometer and gyroscopic sensors of the client device 102 provide measurements representing motion. This information is used to adjust positioning of the augmented reality items relative to the face so that the augmented reality items track the position of the face in 3D and maintain their placement on the face as the face moves around. In some embodiments, the launch of the augmented reality experience includes a preview of the augmented reality experience. For example, the augmented reality experience may be a restricted access experience or premium experience that can be purchased by the user (e.g., by exchanging a certain amount of virtual currency or tokens). When such an augmented reality experience is previewed, only a subset of the augmented reality items are presented on top of the real-world object (e.g., the face), such as 2D images of the augmented reality items. The 2D images do not track movement of the face and positioning of the augmented reality items is not updated based on accelerometer and gyroscopic sensors of the client device 102 that provide measurements representing motion. As such, while in one set of frames the augmented reality items are presented on the cheek of the face depicted in the images, when the user moves around, the augmented reality items maintain the static position and are no longer presented on the cheek (e.g., they may be presented on another real-world surface or another portion of the face) in a subsequent frame. Namely, the augmented reality items are statically positioned and overlay whatever real-world object appears in view at their static position in the video. In some cases, once the access restriction is removed from the given augmented reality experience, the preview of the experience is converted to activation of the augmented reality experience in which the augmented reality items track movement of a real-world object depicted in the video.

Figure 3:
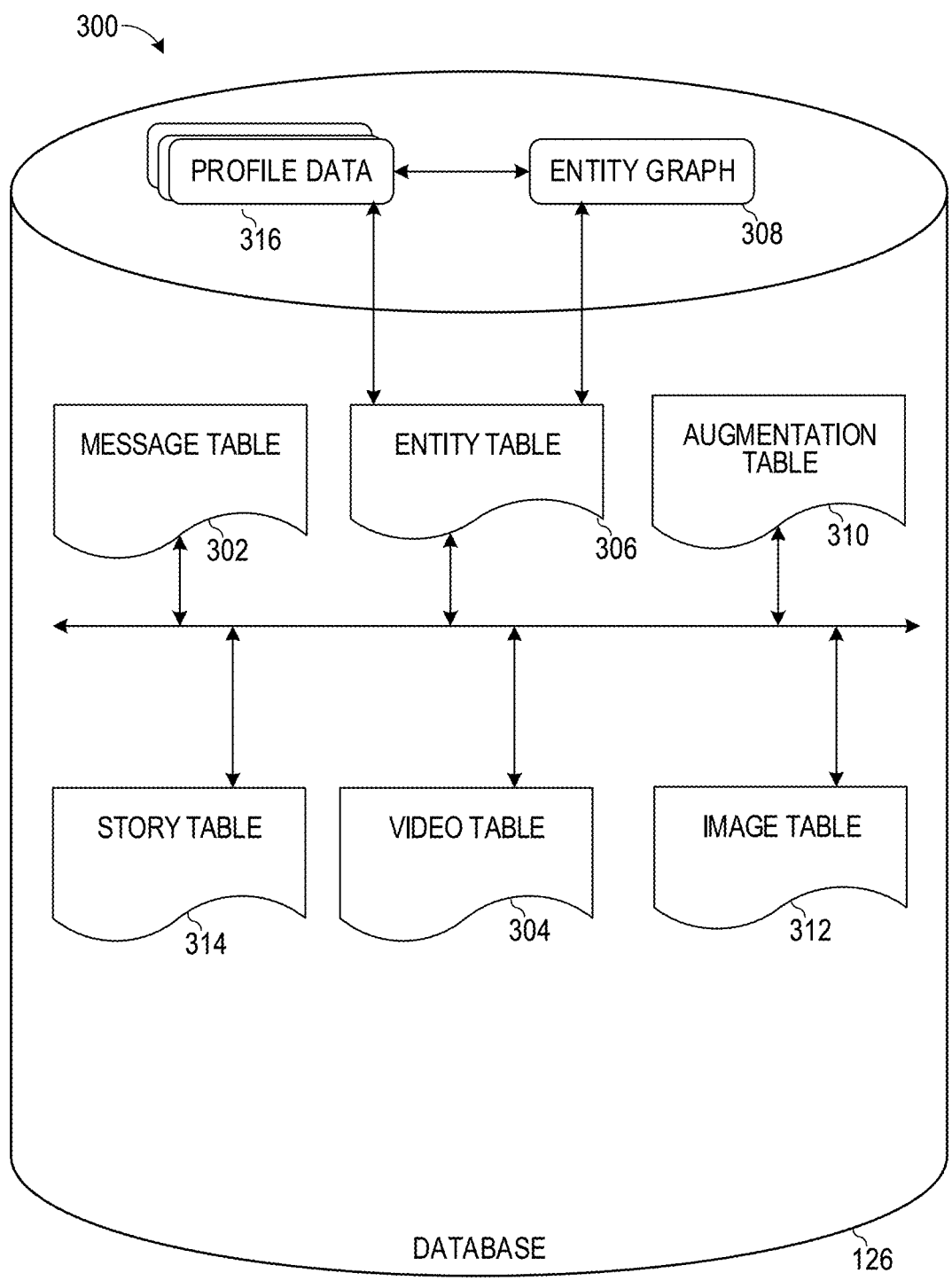
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
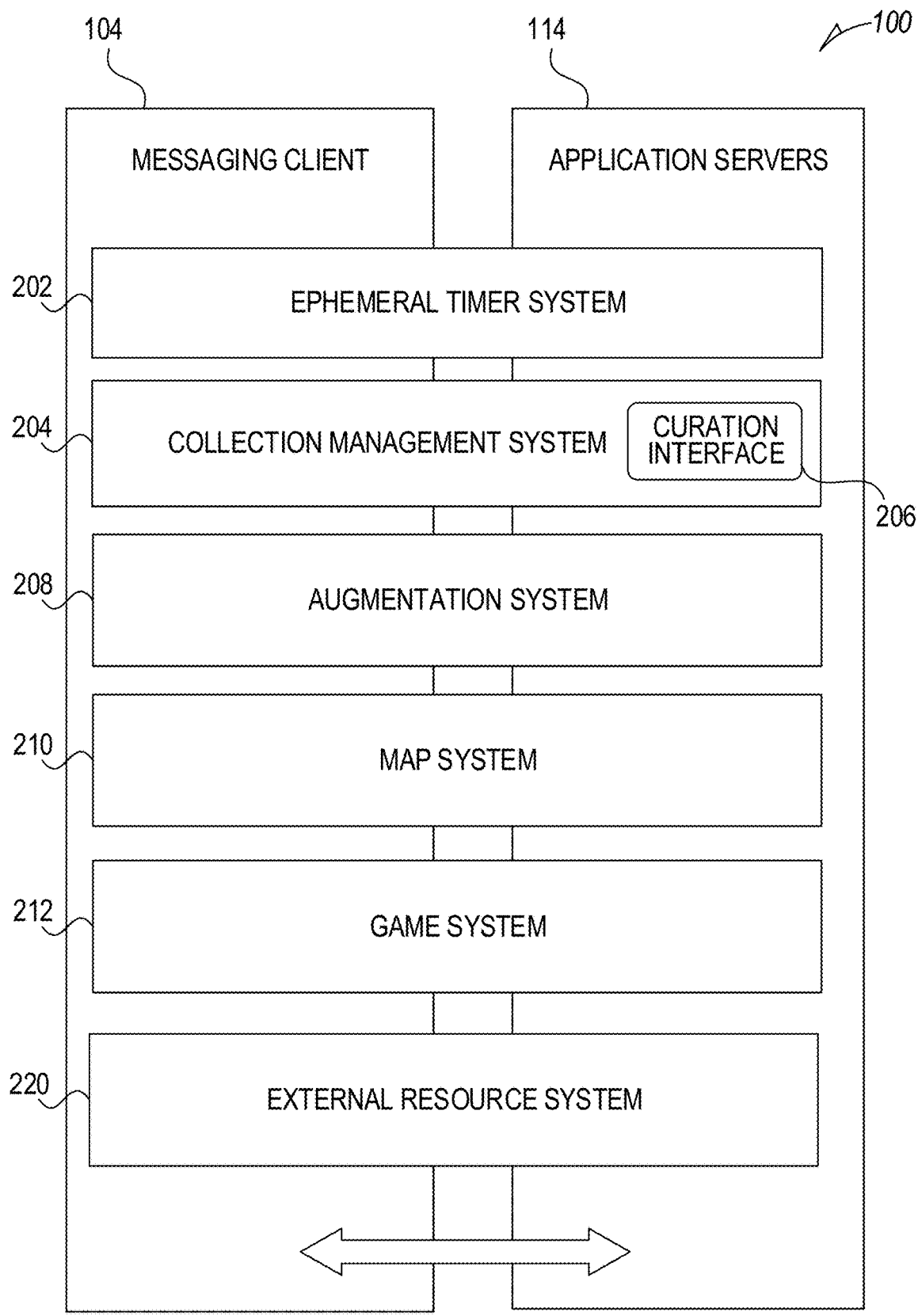
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In some circumstances, a preview of an augmented reality experience is provided instead of the fully activated augmented reality experience. In such cases, only a subset of the augmented reality items associated with a given augmented reality experience are presented or overlaid onto a real-time image or video captured by the client device 102 or an image or video previously received from a third party. For example, only visual elements but not any of the audio elements of the augmented reality experience are presented. As another example, only a first set of visual augmented reality items are presented while a second set of visual augmented reality items are excluded. As another example, the set of visual augmented reality items that are presented in preview are static images that do not track movement of real-world objects depicted in the real-time image or video. In some cases, during preview of the augmented reality experience, only a first set of visual augmented reality items track movement of the real-world object while a second set of the visual augmented reality items do not track movement of the real-world object and are presented as static images. In some cases, the preview of the augmented reality experience includes a video of a third person or party (e.g., a person who is not the user of the client device 102) over which the fully subset of augmented reality items are displayed. In this circumstance, the video demonstrates how the augmented reality experience looks and feels by tracking positions of the third person and moving together with the person depicted in the video.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
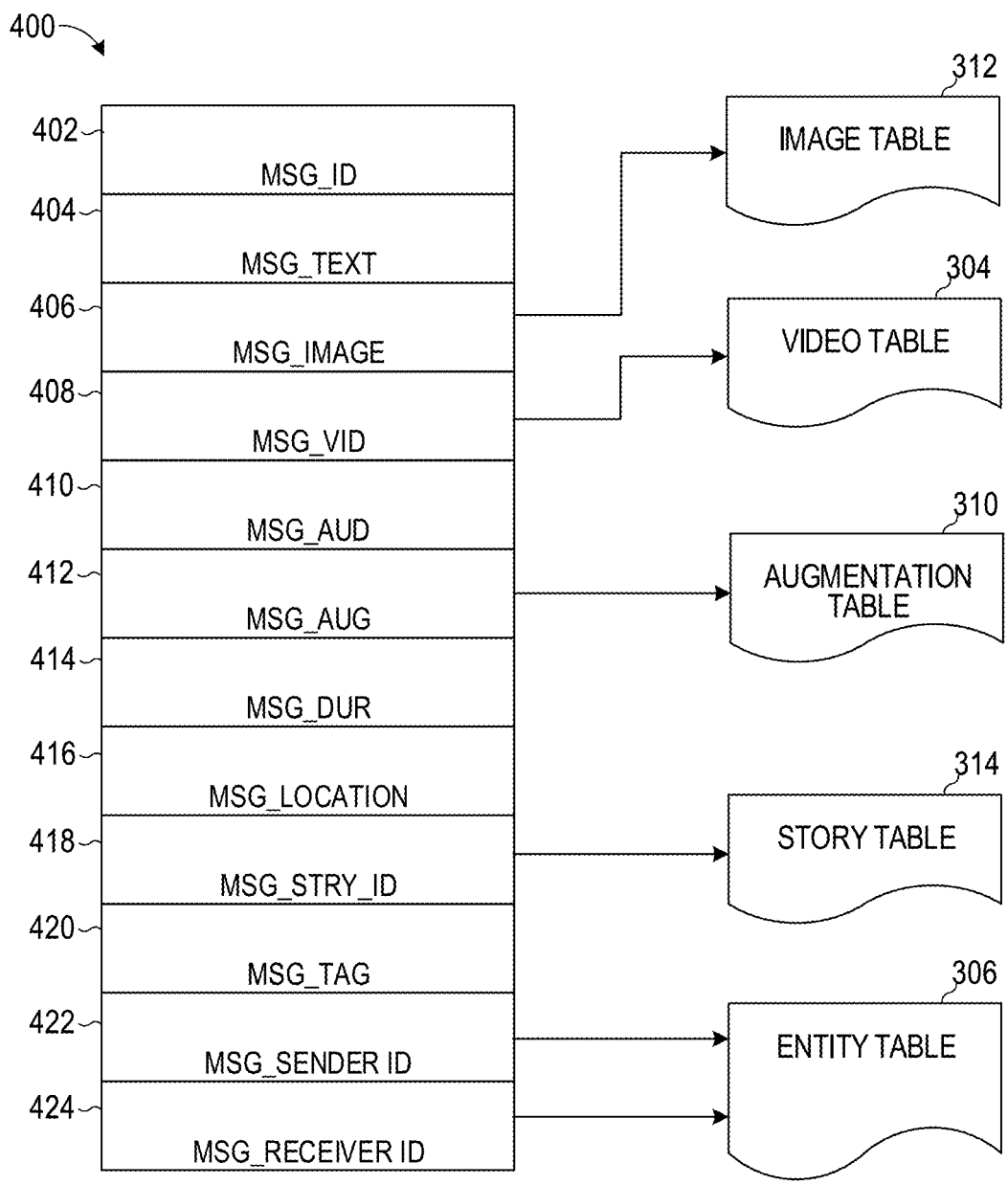
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

FIGS. 5-9 are diagrammatic representations of graphical user interfaces, in accordance with some examples. Specifically, FIGS. 5-9 show representations of graphical user interfaces that include identifiers of augmented reality experiences that include at least one access restricted augmented reality experience. As referred to herein, an access restricted augmented reality experience (restricted access augmented reality experience or an augmented reality experience associated with an access restriction) is an augmented reality experience that is only available to certain users or is only available when an electronic transaction is performed. As an example, the access restricted augmented reality experience correspond to premium experiences that are available to premium level users. Namely, the messaging application may include various augmented reality experiences but a subset of such experiences are available as a whole or on an independent basis to users with different levels of access. Specifically, a first user may access the messaging application for free and without a paid membership. The first user may be provided with free access to a first collection of augmented reality experiences and may be restricted from accessing the access restricted augmented reality experiences. The first user can upgrade their membership, such as by paying a monthly or one-time premium, to a premium level membership. In response, the first user is provided with access to the first collection of augmented reality experiences and to some or all of the access restricted augmented reality experience.

As another example, the access restricted augmented reality experience can be accessed or activated on an individual basis by purchasing rights or paying a certain amount of virtual currency. Specifically, any user with any level of access to the messaging application can be provided with an interface that presents one or more access restricted augmented reality experiences. Each access restricted augmented reality experience is associated with a specified amount of virtual currency that restricts access. When a given user selects an access restricted augmented reality experience which the given user did not previously purchase access or remove restrictions, the given user can perform an electronic transaction to remove the access restrictions. As an example, if the access restricted augmented reality experience is associated with 30 virtual tokens, the user can request to have 30 virtual tokens deducted from a virtual wallet or collection of tokens managed for the user by the messaging application. If the virtual wallet includes a sufficient number of tokens (e.g., more than 30 required for removing the access restrictions from the augmented reality experience), the electronic transaction is completed after deducting the 30 virtual tokens. At that point, the access restriction is removed from the access restricted augmented reality experience and the user can activate the access restricted augmented reality experience. If the virtual wallet does not include a sufficient number of tokens (e.g., less than 30), the messaging application presents an interface that allows the user to purchase additional virtual tokens. After a sufficient number of tokens is purchased, the messaging application confirms the purchase of the access restricted augmented reality experience and removes the access restrictions from the access restricted augmented reality experience.

The messaging application maintains a profile for each user. The profile may indicate by way of a unique identifier which access restricted augmented reality experiences have been previously purchased by the user. Namely, the profile identifies each access restricted augmented reality experience for which the access restrictions have been removed for the given user. Based on whether an augmented reality experience has or does not access restrictions, the messaging application presents identifiers of each augmented reality experience to a user in different user interfaces.

As an example, the messaging application can receive a request from a user to access a personalized page of content. In response, the messaging application searches all or a subset of augmented reality experiences for a set of augmented reality experiences that have attributes that match a profile for the user. The messaging application then accesses identifiers of each identified augmented reality experience and generates a personalized page 500 (FIG. 5A) that includes the identifiers. In some embodiments, the personalized page 500 includes a first portion 510 that includes non-access restricted augmented reality experiences and a second portion 520 that includes access restricted augmented reality experiences. Each of the augmented reality experiences in the first and second portions 510 and 520 include attributes that match a profile of the user of the client device 102 on which they are displayed.

The personalized page 500 includes various options in a top portion for accessing different pages. The options include an access restricted augmented reality experiences option 540 and a trending option 530. Selection of these options causes the messaging application to retrieve the corresponding set of augmented reality experiences and present identifiers of the retrieved augmented reality experiences.

The messaging application may allow individual creators to submit access restricted augmented reality experiences. Namely, an individual creator can generate an augmented reality experience and request that the augmented reality experience be access restricted. In some implementations, the creator can specify the minimum or threshold quantity of virtual tokens needed to access or activate the augmented reality experience. In some implementations, the creator generates a preview of the augmented reality experience. In such cases, the creator specifies which portions or augmented reality items of the augmented reality experience are disabled during the free preview of the augmented reality experience. The messaging application may enable other users to view and purchase access to the access restricted augmented reality experience received from the creator. In some cases, the messaging application may limit the number of access restricted augmented reality experiences that a given creator can submit. For example, the messaging application may determine whether the creator has previously submitted a threshold number of augmented reality experiences that are not access restricted (e.g., whether the creator has previously provided at least 5 free augmented reality experiences). In response to determining that the creator has previously submitted the threshold number (e.g., 5) of augmented reality experiences that are not access restricted, the messaging application may enable the creator to request an access restriction for a given augmented reality experience. The messaging application may require each creator to submit the threshold number of non-access restricted augmented reality experiences before allowing the creator to submit one additional access restricted augmented reality experience.

In some embodiments, the messaging application restricts or limits creators from submitting or requesting that a given augmented reality experience be access restricted based on performance metrics associated with previously submitted non-access restricted augmented reality experiences. For example, the messaging application may determine whether the creator has previously submitted augmented reality experiences that are not access restricted and that each met a popularity criterion (e.g., each of the non-access restricted augmented reality experiences has been accessed, shared, or used by a threshold number of users or times). In response to determining that a certain number of augmented reality experiences that are not access restricted have met the popularity criterion, the messaging application may enable the creator to request an access restriction for one new augmented reality experience.

In some embodiments, the non-access restricted augmented reality experiences displayed in the first portion 510 are represented by respective icons 512 (e.g., thumbnails). The thumbnails include images or videos that represent the behavior of the non-access restricted augmented reality experiences. In some cases, each icon 512 includes an image, a title, a name of the creator, a name of a collection associated with the respective non-access restricted augmented reality experience and any other suitable information. The icons 512 are presented in a first size. The messaging application ranks or sorts the icons 512 based on performance attributes (e.g., popularity) of each non-access restricted augmented reality experience and based on how well each non-access restricted augmented reality experience matches a user's profile. The messaging application ranks the icons 512 based on how each of the non-access restricted augmented reality experience perform relative to each other and independently of how other access-restricted augmented reality experiences perform.

The access restricted augmented reality experiences displayed in the second portion 520 are represented by respective icons 522 (e.g., thumbnails). The thumbnails include images or videos that represent the behavior of the access restricted augmented reality experiences. In some cases, each icon 522 includes an image, a title, a name of the creator, a name of a collection associated with the respective access restricted augmented reality experience and any other suitable information. The messaging application ranks or sorts the icons 522 based on performance attributes (e.g., popularity) of each access restricted augmented reality experience and based on how well each access restricted augmented reality experience matches a user's profile. The messaging application ranks the icons 522 based on how each of the access restricted augmented reality experience perform relative to each other and independently of how other non-access-restricted augmented reality experiences perform.

The icons 522 for the access restricted augmented reality experiences include a restriction status icon 524. The restriction status icon 524 can indicate the parameters needed to remove the restriction (e.g., the restriction status icon 524 may specify a price or minimum quantity of virtual tokens needed to purchase rights to remove the restrictions from the respective access restricted augmented reality experience). In some embodiments, the icons 522 representing the access restricted augmented reality experiences in the second portion 520 are displayed in a second size that is larger than the first size in which the icons 512 in the first portion 510 are displayed. Namely, the access restricted augmented reality experiences are represented in the personalized page 500 using larger sized icons than non-access restricted augmented reality experiences.

In some embodiments, the messaging application receives a user selection of the trending option 530 while the personalized page 500 is displayed. In response, the messaging application displays a trending page 501. Specifically, in response to receiving a user selection of the trending option 530, the messaging application searches a database for a list of most popular access restricted augmented reality experiences and non-access restricted augmented reality experiences. As an example, the messaging application obtains the number of times each augmented reality experience was selected by users of the messaging application, the number of times each augmented reality experience was shared with other users on the messaging application or mentioned in a communication. Based on these parameters, the messaging application ranks the augmented reality experiences (access restricted and non-access restricted together) and generates a display of the trending page 501 that includes the access restricted and non-access restricted augmented reality experiences.

As an example, the trending page 501 includes a first icon 532 (e.g., a thumbnail) representing a non-access restricted augmented reality experience. The first icon 532 includes an image or video representing the augmented reality experience and a title and name of the creator of the augmented reality experience. The messaging application can receive a user selection of the first icon 532. In response, the messaging application opens a camera feed of the client device 102 and activates the augmented reality experience associated with the first icon 532. As an example, the messaging application obtains one or more augmented reality items associated with the augmented reality experience and overlays those augmented reality items on the real-time video being captured by the client device 102 and presented in the camera feed. The augmented reality items are repositioned and track movement of a real-time object depicted in the camera feed.

The trending page 501 also includes a second icon 534 (e.g., a thumbnail) representing an access-restricted augmented reality experience. The second icon 534 includes an image or video representing the augmented reality experience and a title and name of the creator of the augmented reality experience. The second icon 534 also includes a restriction status icon 536 that can indicate the parameters needed to remove the restriction (e.g., the restriction status icon 536 may specify a price or minimum quantity of virtual tokens needed to purchase rights to remove the restrictions from the respective access restricted augmented reality experience). The restriction status icon 536 is displayed for the access-restricted augmented reality experience even if the user has previously purchased rights or removed restrictions associated with the access restricted augmented reality experience. In some embodiments, each icon presented on the trending page 501 is of the same size regardless of whether the icon corresponds to a restricted access or non-restricted access augmented reality experience. This is unlike the personalized page 500 in which the restricted access augmented reality experiences are represented by icons that are larger in size than non-restricted access augmented reality experiences.

In some implementations, the restricted status icon 536 is only included for those access restricted augmented reality experience that the user has not previously purchased the rights to remove the access restrictions. In such circumstances, the messaging application accesses a database that specifies those access restricted augmented reality experience that the user has previously purchased rights to remove restrictions. The messaging application determines if a given icon presented in the trending page 501 corresponds to an access restricted augmented reality experience for which the user previously removed a restriction (as indicated by the database) and if so, the messaging application prevents presentation of the restriction status icon 536.

In response to receiving a user selection of the second icon 534, the messaging application determines whether the user has previously removed access restrictions (e.g., paid for using virtual tokens) from the augmented reality experience associated with the second icon 534. In response to determining that the user previously removed the access restrictions, the messaging application opens a camera feed of the client device 102 and activates the augmented reality experience associated with the second icon 534. As an example, the messaging application obtains one or more augmented reality items associated with the augmented reality experience and overlays those augmented reality items on the real-time video being captured by the client device 102 and presented in the camera feed. The augmented reality items are repositioned and track movement of a real-time object depicted in the camera feed.

In response to determining that that the user has not previously removed the access restrictions (e.g., the user has not previously purchased the rights to access or activate the augmented reality experience), the messaging application generates a prompt indicating the cost in virtual tokens to purchase the rights to access or activate the selected augmented reality experience. The prompt may indicate the current number of virtual tokens available to the user in the user's virtual token wallet and may include a confirm option. If the user does not currently have enough tokens in the virtual wallet to purchase the augmented reality experience, the messaging application presents an option to access a virtual token store to purchase additional virtual tokens. The prompt may also include a preview option. In response to receiving a user selection of the preview option, the messaging application opens a camera feed of the client device 102 and presents static 2D images of the augmented reality experience associated with the second icon 534. As an example, the messaging application obtains one or more augmented reality items associated with the augmented reality experience and overlays those augmented reality items on the real-time video being captured by the client device 102 and presented in the camera feed at static positions. The augmented reality items are not repositioned and do not track movement of a real-time object depicted in the camera feed.

Figure 6:
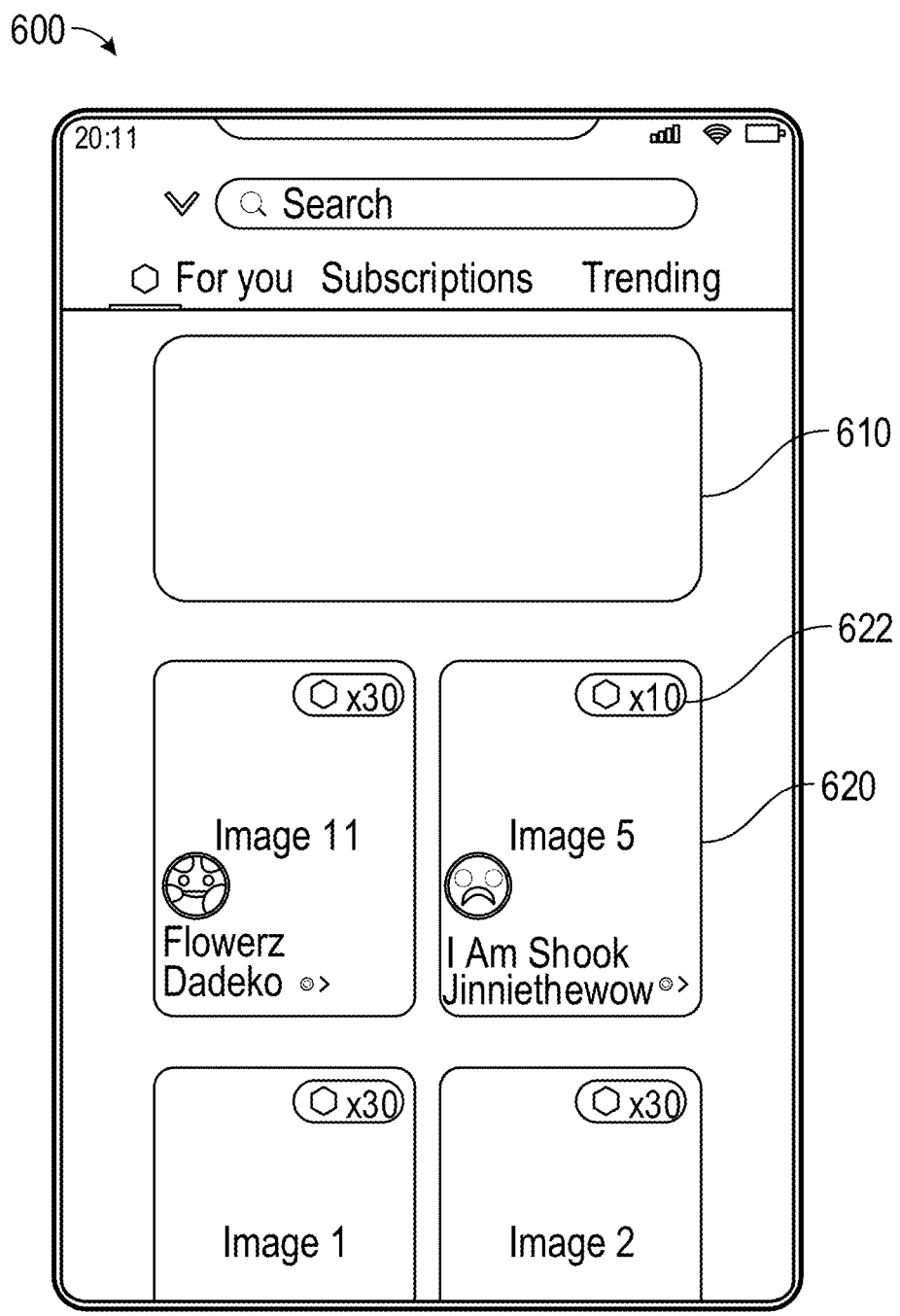

In some embodiments, the messaging application receives a user selection of the access restricted augmented reality experiences option 540. This selection can be received while the personalized page 500 is presented or while the trending page 501 is presented. In response to receiving the user selection of the access restricted augmented reality experiences option 540, the messaging application navigates the user to an access restricted augmented reality experiences page 600 (FIG. 6). The messaging application determines whether the user has previously accessed the access restricted augmented reality experiences page 600 in the past. If so, the messaging application determines whether the user accessed the page 600 more than a threshold number of times (e.g., more than three times). In response to determining that the user did not access page 600 more than the threshold number of times, the messaging application presents an introductory tile 610. In response to determining that the user accessed page 600 more than the threshold number of times or that the user has previously purchased rights or removed restrictions from at least one access-restricted augmented reality experience, the messaging application excludes the introductory tile 610 from being presented on page 600. The introductory tile explains various features of the access restricted augmented reality experiences. Such features includes an explanation of how to remove access restrictions (e.g., how to access a virtual wallet and purchase virtual tokens) and how to access or active previews of the access-restricted augmented reality experiences.

The messaging application searches a database for a list of most popular access restricted augmented reality experiences. As an example, the messaging application obtains the number of times each augmented reality experience was selected by users of the messaging application, the number of times each augmented reality experience was shared with other users on the messaging application or mentioned in a communication, and the number of times each access-restricted augmented reality experience was purchased or had restrictions removed by users. Based on these parameters, the messaging application ranks the access-restricted augmented reality experiences and generates a display of the page 600 that includes the access restricted augmented reality experiences.

The page 600 also includes icons 620 (e.g., a thumbnails) representing access-restricted augmented reality experiences. The icons 620 include images or videos representing the augmented reality experiences and titles and names of the creators of the augmented reality experiences. The icons 620 also includes a restriction status icon 622 that can indicate the parameters needed to remove the restriction (e.g., the restriction status icon 622 may specify a price or minimum quantity of virtual tokens needed to purchase rights to remove the restrictions from the respective access restricted augmented reality experience). In some embodiments, each icon presented on the page 600 is of the same size.

In response to receiving a user selection of a given icon 620, the messaging application generates a prompt indicating the cost in virtual tokens to purchase the rights to access or activate the selected augmented reality experience. The prompt may indicate the current number of virtual tokens available to the user in the user's virtual token wallet and may include a confirm option. If the user does not currently have enough tokens in the virtual wallet to purchase the augmented reality experience, the messaging application presents an option to access a virtual token store to purchase additional virtual tokens. The prompt may also include a preview option. In response to receiving a user selection of the preview option, the messaging application opens a camera feed of the client device 102 and presents static 2D images of the augmented reality experience associated with the given icon 620. As an example, the messaging application obtains one or more augmented reality items associated with the augmented reality experience and overlays those augmented reality items on the real-time video being captured by the client device 102 and presented in the camera feed at static positions. The augmented reality items are not repositioned and do not track movement of a real-time object depicted in the camera feed.

Figure 7A:
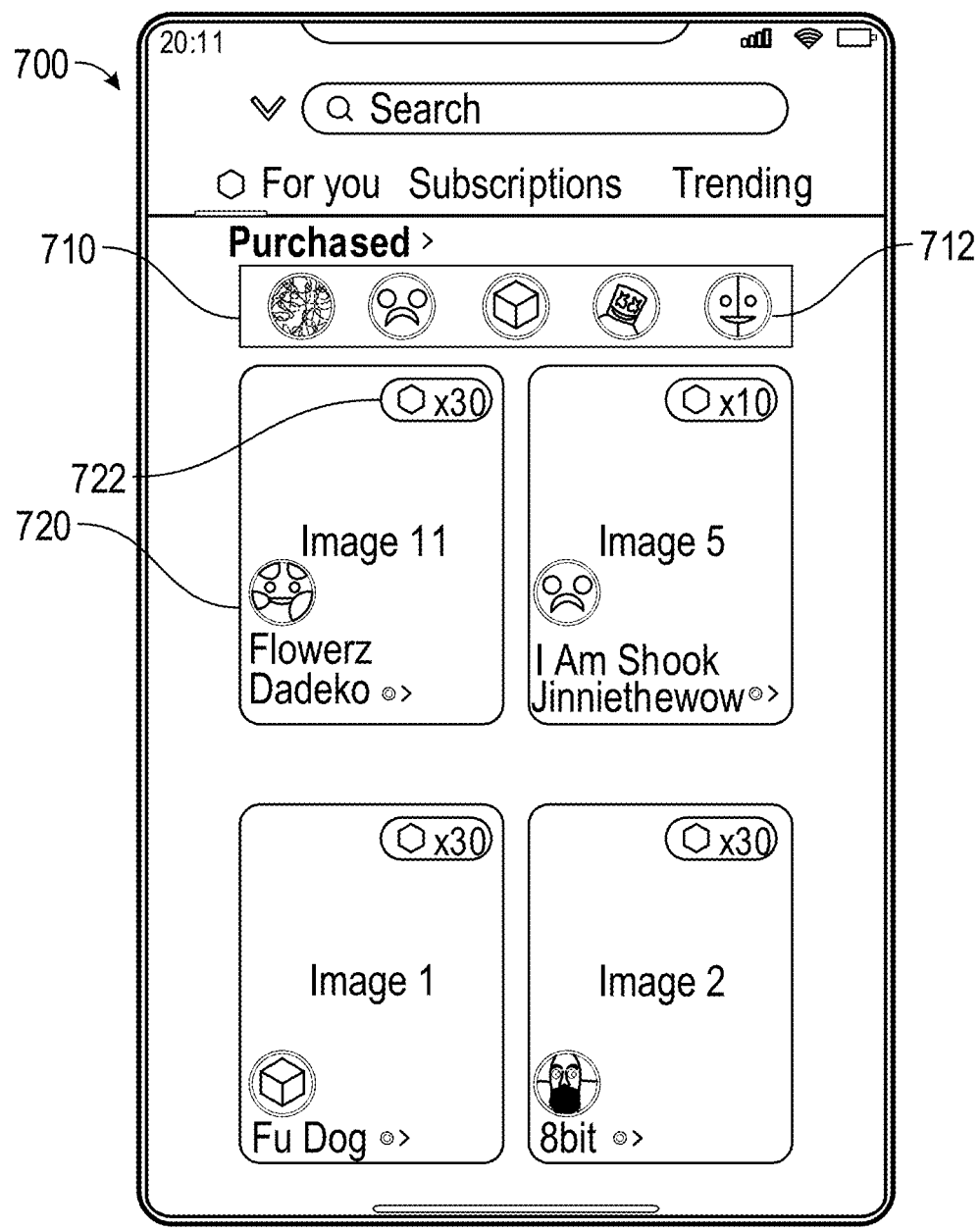

In some embodiments, the messaging application determines that the user has previously purchased rights to or remove access restrictions from one or more access-restricted augmented reality experiences. In such cases, instead of presenting the introductory tile 610, the messaging application presents a purchased region 710, as shown in FIG. 7A. The purchased region 710 includes one or more indicators 712 that visually represent each access-restricted augmented reality experience that the user previously purchased rights to or from which the user removed restrictions. Those access-restricted augmented reality experiences that the user has not previously purchased rights to are presented in another portion 720. Access-restricted augmented reality experiences in the portion 720 are represented using icons 722 and can be interacted with in the same manner as discussed above in connection with FIG. 6 to preview or purchase rights to. The icons 722 used to represent access-restricted augmented reality experiences that the user has not previously purchased rights to or removed restrictions from are different (e.g., a larger and square in size) from the indicators 712 (e.g., which are smaller and circular) that represent each access-restricted augmented reality experience that the user previously purchased rights to or from which the user removed restrictions.

Figure 7B:
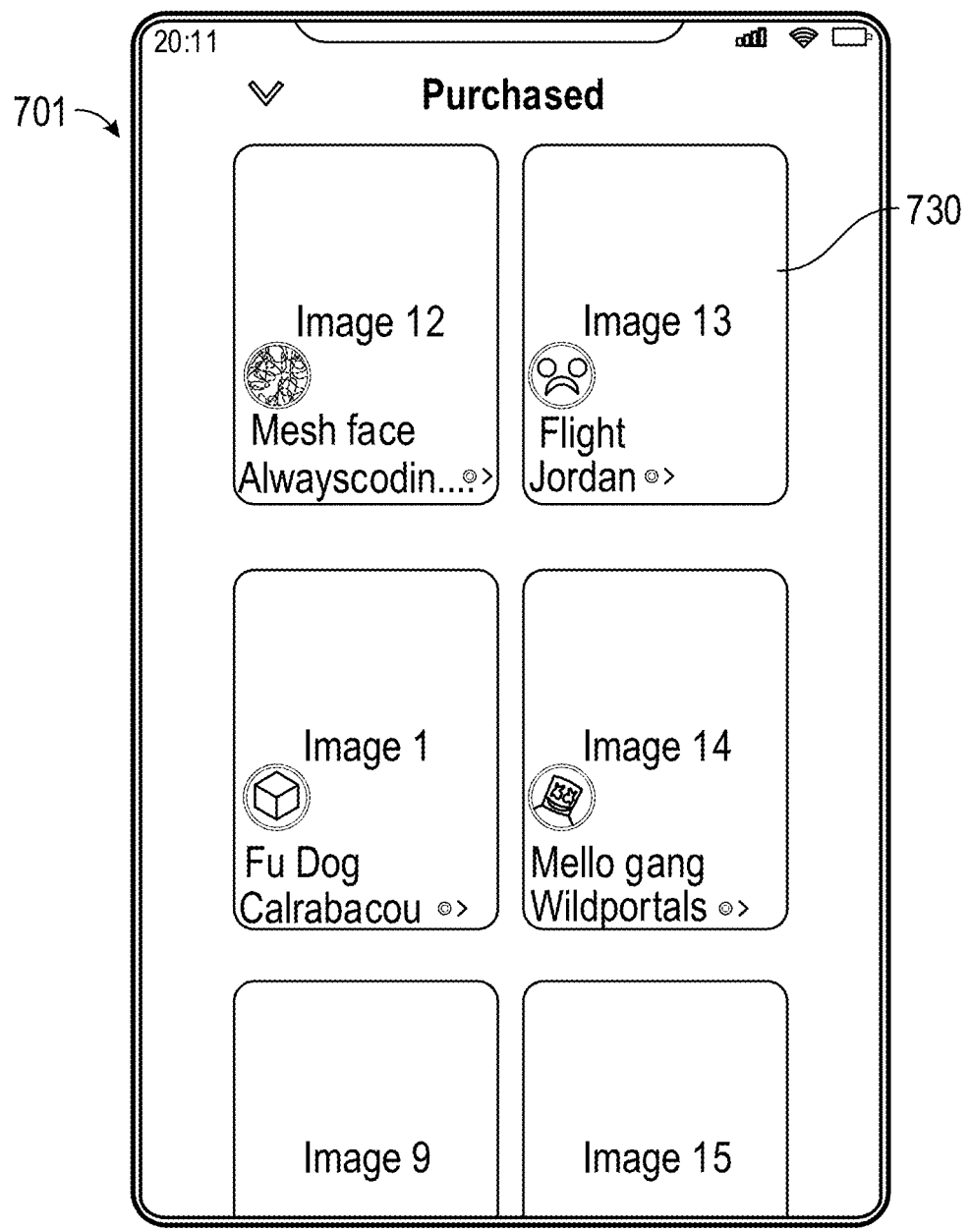

The indicators 712 in the purchased region 710 are ranked and sorted by recency or use or purchase and/or by popularity. For example, a first access-restricted augmented reality experience that has been purchased by the user more recently than a second access-restricted augmented reality experience may be represented by a first indicator earlier in the list of indicators 712 than a second indicator representing the second access-restricted augmented reality experience. In response to receiving a user selection of the purchased region, the messaging application navigates the user to a purchased page 701 (FIG. 7B). The purchased page 701 includes various icons 730 (e.g., thumbnails) associated with each of the one or more indicators 712 that visually represent each access-restricted augmented reality experience that the user previously purchased rights to or from which the user removed restrictions. The icons 730 are presented without a restriction status icon (e.g., icon 622) as the user has already purchased rights to access the access-restricted augmented reality experience.

The messaging application can receive a user selection of the first indicator 712 or a given icon of the icons 730. In response, the messaging application opens a camera feed of the client device 102 and activates the access-restricted augmented reality experience associated with the first indicator 712 or the given icon of the icons 730. As an example, the messaging application obtains one or more augmented reality items associated with the augmented reality experience and overlays those augmented reality items on the real-time video being captured by the client device 102 and presented in the camera feed. The augmented reality items are repositioned and track movement of a real-time object depicted in the camera feed.

In some embodiments, the messaging application receives a user request to access a collection of augmented reality experiences. For example, the user can request to view a plurality of augmented reality experiences that each represent a different makeup of a makeup palate. The request can be received by presenting a list of collections and receiving a user selection of a collection from the list. In such cases, the messaging application obtains a list of all the augmented reality experiences associated with the selected collection.

In some embodiment, in response to determining that the collection includes restricted access and non-restricted access augmented reality experiences, the messaging application determines whether the collection includes more than a threshold number or quantity of non-restricted access augmented reality experiences. If the collection includes less than the threshold number of quantity of non-restricted access augmented reality experiences, the messaging application presents a page (not shown) similar to page 501 in which each augmented reality experience of the collection is represented by an icon. The messaging application excludes from the list of icons that are presented on the page, an icon or representation of the access restricted augmented reality experience that is part of the collection. If the collection includes more than the threshold number of quantity of non-restricted access augmented reality experiences, the messaging application presents a page (not shown) similar to page 501 in which each augmented reality experience of the collection is represented by an icon including the display of an icon representing the access restricted augmented reality experience that is part of the collection. The access-restricted augmented reality experience can be identified with a suitable indicator, such as restriction status icon 536.

In some embodiment, in response to determining that the collection includes restricted access and non-restricted access augmented reality experiences, the messaging application determines whether the collection includes non-restricted access augmented reality experiences that satisfy minimum performance metrics (e.g., have each been activated, accessed or shared by a minimum number of users). If the collection includes non-restricted access augmented reality experiences that fail to satisfy minimum performance metrics, the messaging application presents a page (not shown) similar to page 501 in which each augmented reality experience of the collection is represented by an icon. The messaging application excludes from the list of icons that are presented on the page, an icon or representation of the access restricted augmented reality experience that is part of the collection. If the collection includes non-restricted access augmented reality experiences that satisfy minimum performance metrics, the messaging application presents a page (not shown) similar to page 501 in which each augmented reality experience of the collection is represented by an icon including the display of an icon representing the access restricted augmented reality experience that is part of the collection. The access-restricted augmented reality experience can be identified with a suitable indicator, such as restriction status icon 536.

Figure 8A:
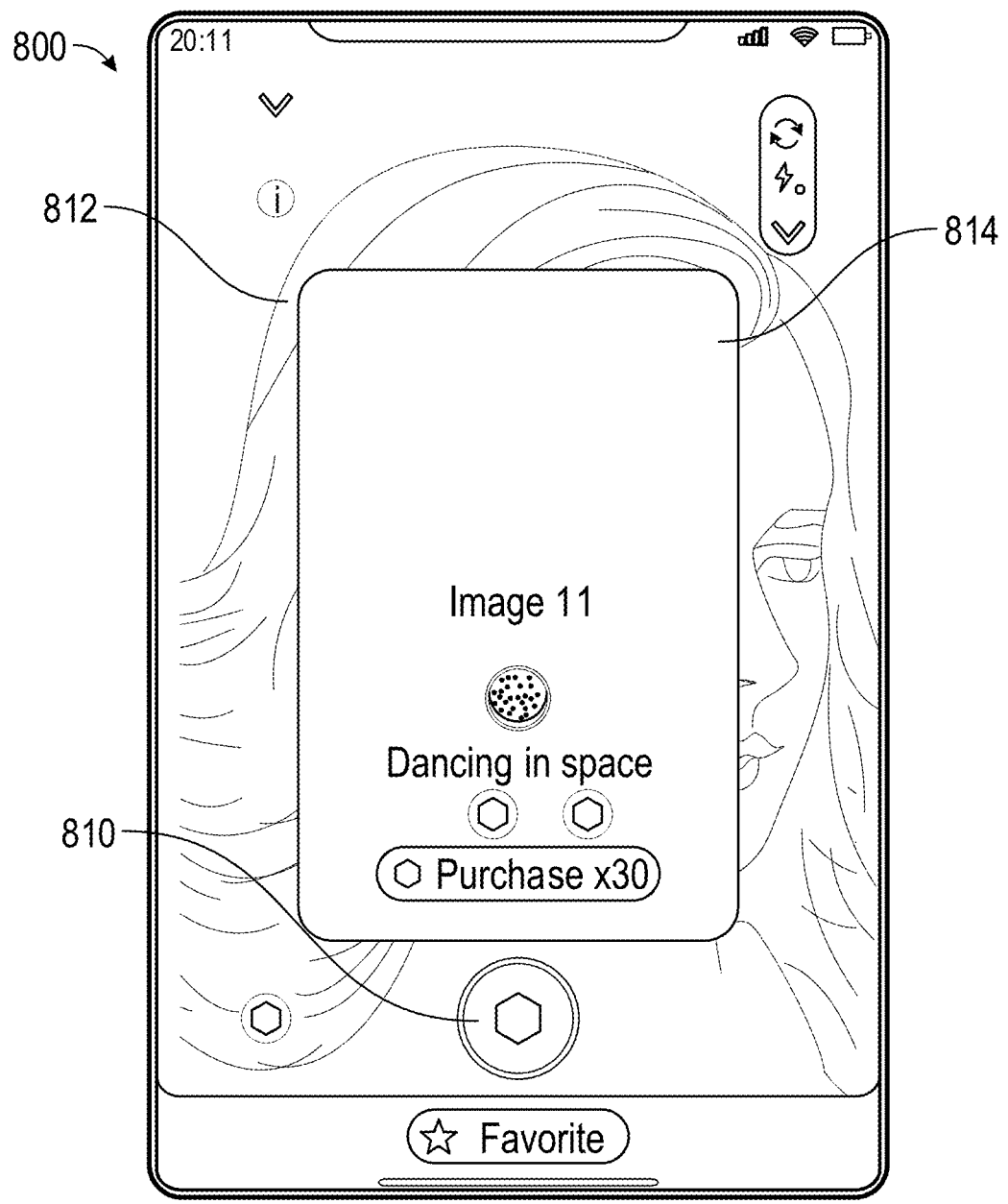
Figure 8B:
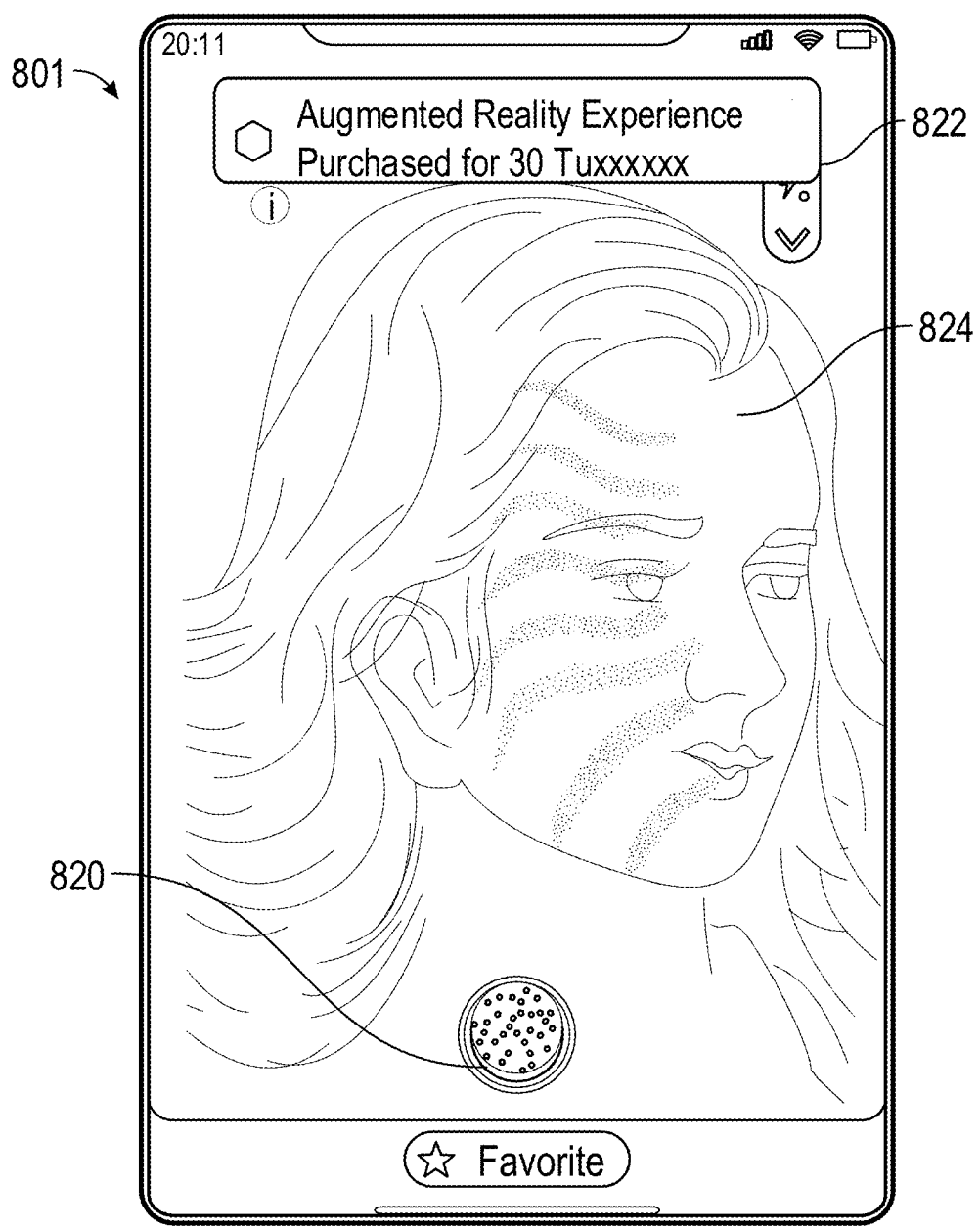
Figure 9A:
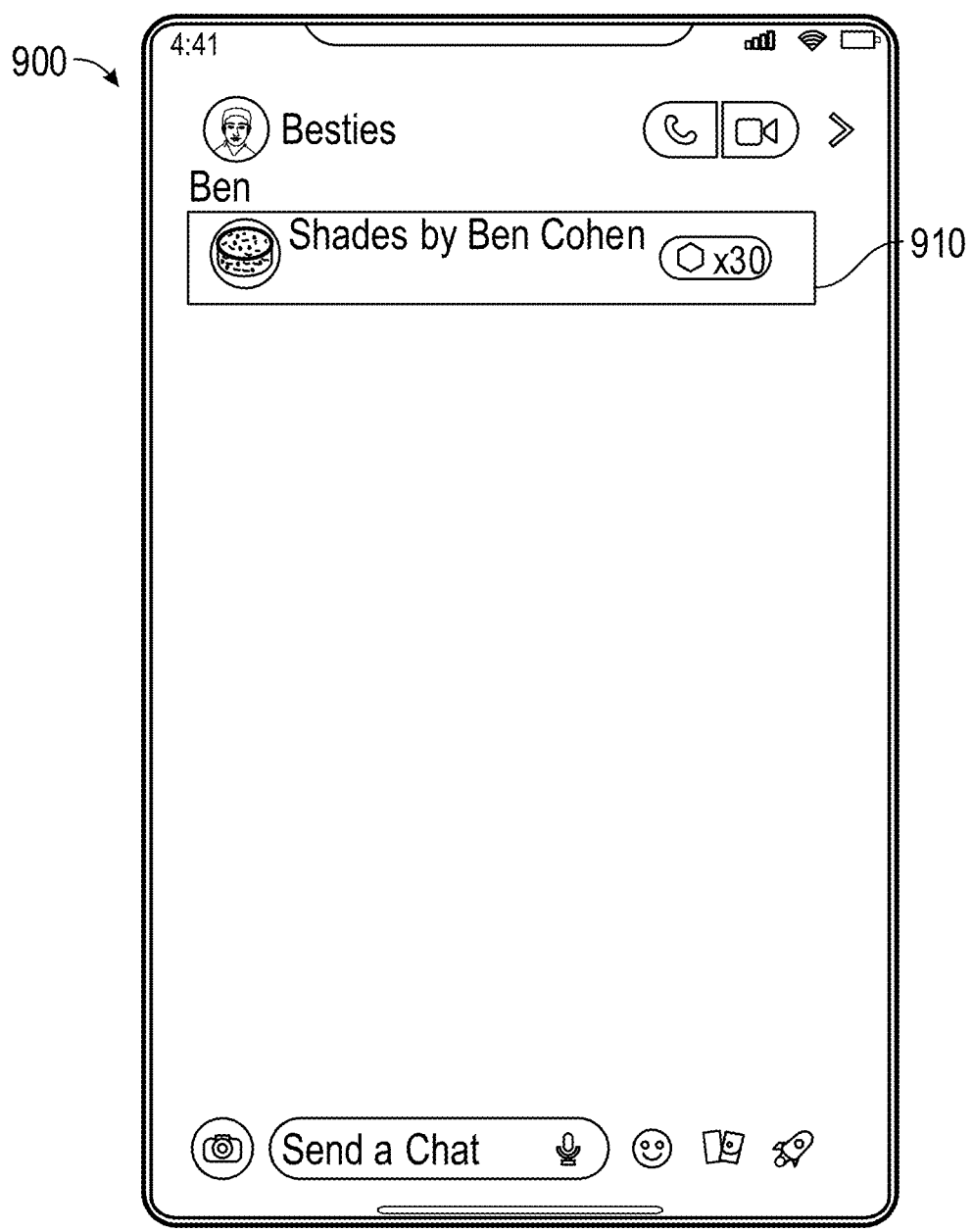
Figure 9B:
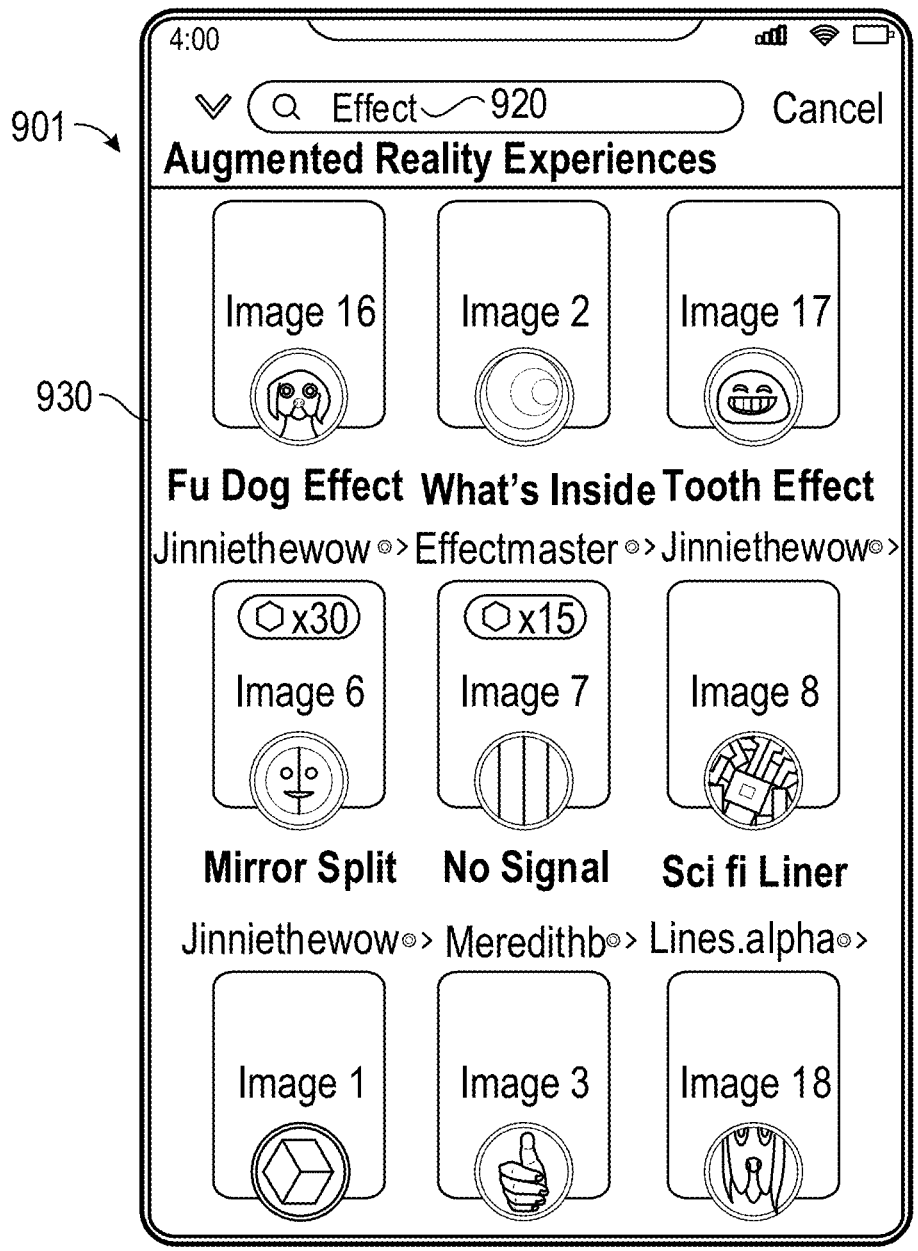

In some embodiments, a user can activate a camera feed of the client device 102. While a camera feed is presented in screen 800, as shown in FIG. 8A, the user can request to view a list of available augmented reality experiences. Each augmented reality experience is presented with a respective icon on top of the real-time video of the camera feed. The user can scroll through the list of icons. In some cases, one of the icons is associated with an access-restricted augmented reality experience. Such an icon is modified to depict an restriction status icon 810 that can indicate the parameters needed to remove the restriction (e.g., the icon 810 may resemble a virtual token). In some implementations, the messaging application inserts an icon representing an access-restricted augmented reality experience after the user browses through a minimum number of non-access restricted augmented reality experiences in the camera feed. For example, after the user swipes through more than 10 non-access restricted augmented reality experiences without activating any of the non-access restricted augmented reality experiences, the messaging application identifies an access restricted augmented reality experience (e.g., from which the user has not previously removed the access restrictions) and presents the icon 810 that is associated with the identified access restricted augmented reality experience.

The messaging application determines whether the user has previously removed access restrictions from the access-restricted augmented reality experience corresponding to the icon 810. In response to receiving a user selection of the icon 810 and in response to determines that the user has not previously removed access restrictions from the access-restricted augmented reality experience corresponding to the icon 810, the messaging application presents a prompt 814.

The prompt 814 may provide visual information that explains the behavior of the access-restricted augmented reality experience. The messaging application also presents a preview of the access-restricted augmented reality experience. For example, the messaging application obtains one or more augmented reality items associated with the access-restricted augmented reality experience and presents the one or more augmented reality items 812 in a static position such that they do not track movement of a real-world object (e.g., a face) depicted in the real-time camera feed. The prompt 814 includes a purchase option that indicates the amount of virtual tokens needed to activate or purchase the rights to the selected access-restricted augmented reality experience.

As an example, if the access restricted augmented reality experience is associated with 30 virtual tokens, the prompt 814 indicates that 30 virtual tokens will be deducted from the user's virtual token wallet if the user confirms purchase of the access-restricted augmented reality experience. The user can request to have 30 virtual tokens deducted from a virtual wallet or collection of tokens managed for the user by the messaging application. If the virtual wallet includes a sufficient number of tokens (e.g., more than 30 required for removing the access restrictions from the augmented reality experience), the electronic transaction is completed after deducting the 30 virtual tokens. At that point, the access restriction is removed from the access restricted augmented reality experience and the user can activate the access restricted augmented reality experience.

As an example, a graphical user interface 801 (FIG. 8B) is presented in which the one or more augmented reality items 824 associated with the purchased access-restricted augmented reality experience are displayed and overlaid on top of the real-time video or camera feed and track movement of a real-world object depicted in the camera feed (e.g., track movement of the face so that they are dynamically repositioned as the face moves around in the video). The graphical use interface 801 also temporarily presents a message 822 indicating that the access-restricted augmented reality experience was successfully purchased. After the user completes purchasing the access-restricted augmented reality experience, the messaging application replaces the restriction status icon 810 with an icon 820 that is unique and representative of the purchased access-restricted augmented reality experience. Specifically, the restriction status icon 810 is the same for all of the access-restricted augmented reality experiences that the user browses in the camera view and the icon 820 is unique to a given access-restricted augmented reality experience that the user purchases.

In some cases, if the virtual wallet does not include a sufficient number of tokens (e.g., less than 30), the messaging application presents an interface that allows the user to purchase additional virtual tokens. After a sufficient number of tokens is purchased, the messaging application confirms the purchase of the access restricted augmented reality experience and removes the access restrictions from the access restricted augmented reality experience.

In some embodiments, the user may receive a communication from a friend that identifies an access restricted augmented reality experience. For example, as shown in user interface 900 (FIG. 9A), the user is involved in a conversation with one or more other users or friends. During the conversation one or more messages are exchanged with the friends in the conversation. One of the messages may include an attachment that identifies an access restricted augmented reality experience 910. The attachment may specify the minimum quantity of virtual tokens needed to purchase rights to access the access restricted augmented reality experience identified in the communication. In response to receiving a user selection of the attachment, the messaging application may activate a camera feed and present a preview of the access restricted augmented reality experience. The user can purchase access to the access restricted augmented reality experience to remove the restrictions in the same manner as discussed above.

In some embodiments, the messaging application presents a graphical user interface 901 (FIG. 9B) that allows a user to input a search string to identify access restricted and non-access restricted augmented reality experiences. In response to receiving a search string 920, the messaging application searches names, collections, or attributes associated with augmented reality experiences stored in the messaging application. Specifically, in response to receiving the search string, the messaging application searches a database for a list of most popular access restricted augmented reality experiences and non-access restricted augmented reality experiences that include names, collections, or attributes that match or correspond to the search string. As an example, the messaging application generates a display of the user interface 901 that includes the access restricted and non-access restricted augmented reality experiences. The user can interact with the user interface 901 in the same or similar manner as discussed above in connection with page 501 (FIG. 5B).

Figure 10:
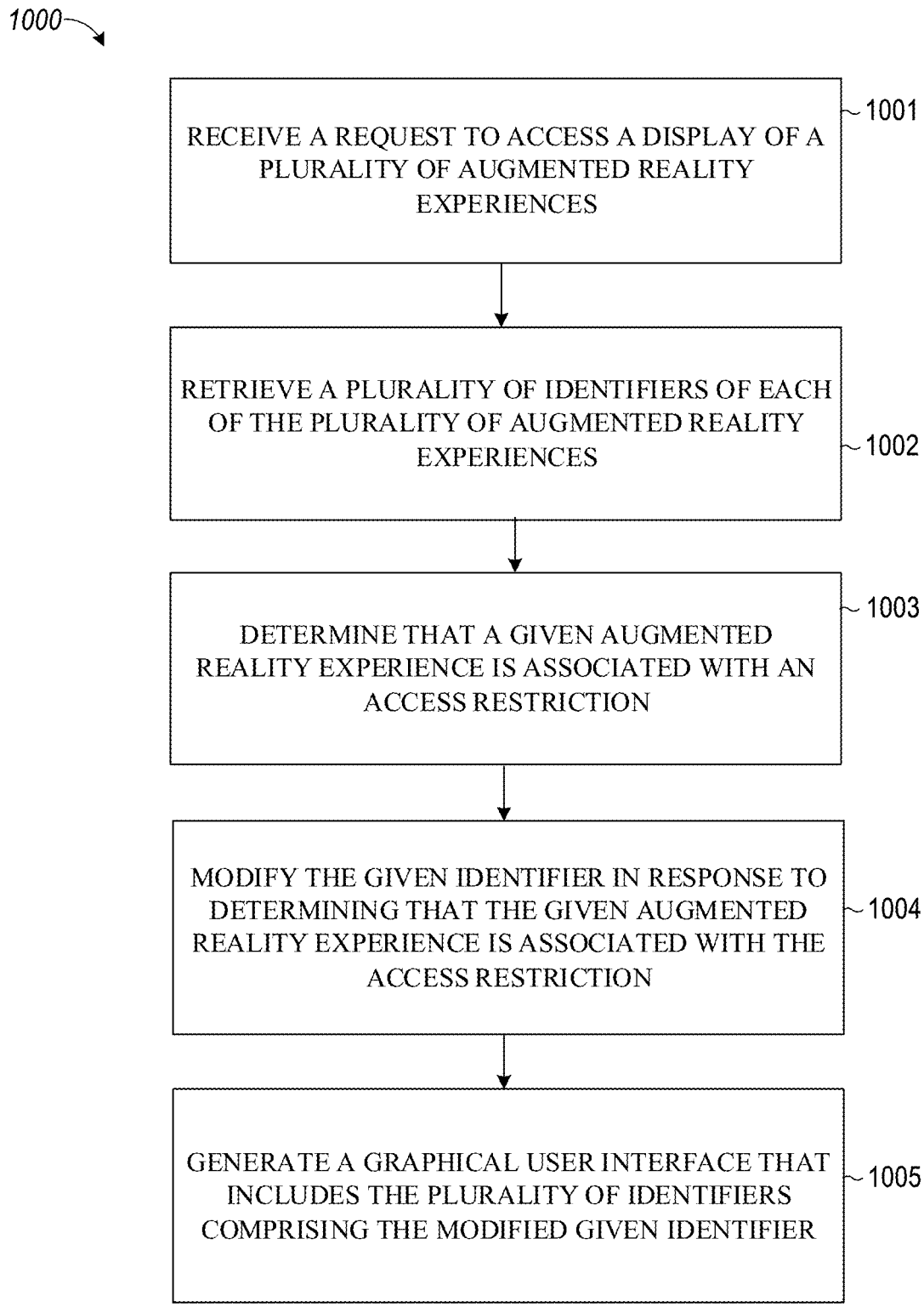
FIG. 10 is a flowchart illustrating example operations of the messaging application server, according to example embodiments.

FIG. 10 is a flowchart illustrating example operations of the messaging client 104 in performing process 1000, according to example embodiments. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other embodiments at least some of the operations of the process 1000 may be deployed on various other hardware configurations. The operations in the process 1000 can be performed in any order, in parallel, or may be entirely skipped and omitted.

At operation 1001, the image processing server 122 receives a request to access a display of a plurality of augmented reality experiences. In some cases, the operations of FIG. 10 can be performed locally by the client device 102 instead of, or in addition to, the image processing server 122. For example, the image processing server 122 receives a request to access a personalized page 500, a trending page 501, a page 600 of access-restricted augmented reality experiences, or a camera feed with an augmented reality experience selection region.

Figure 5A:
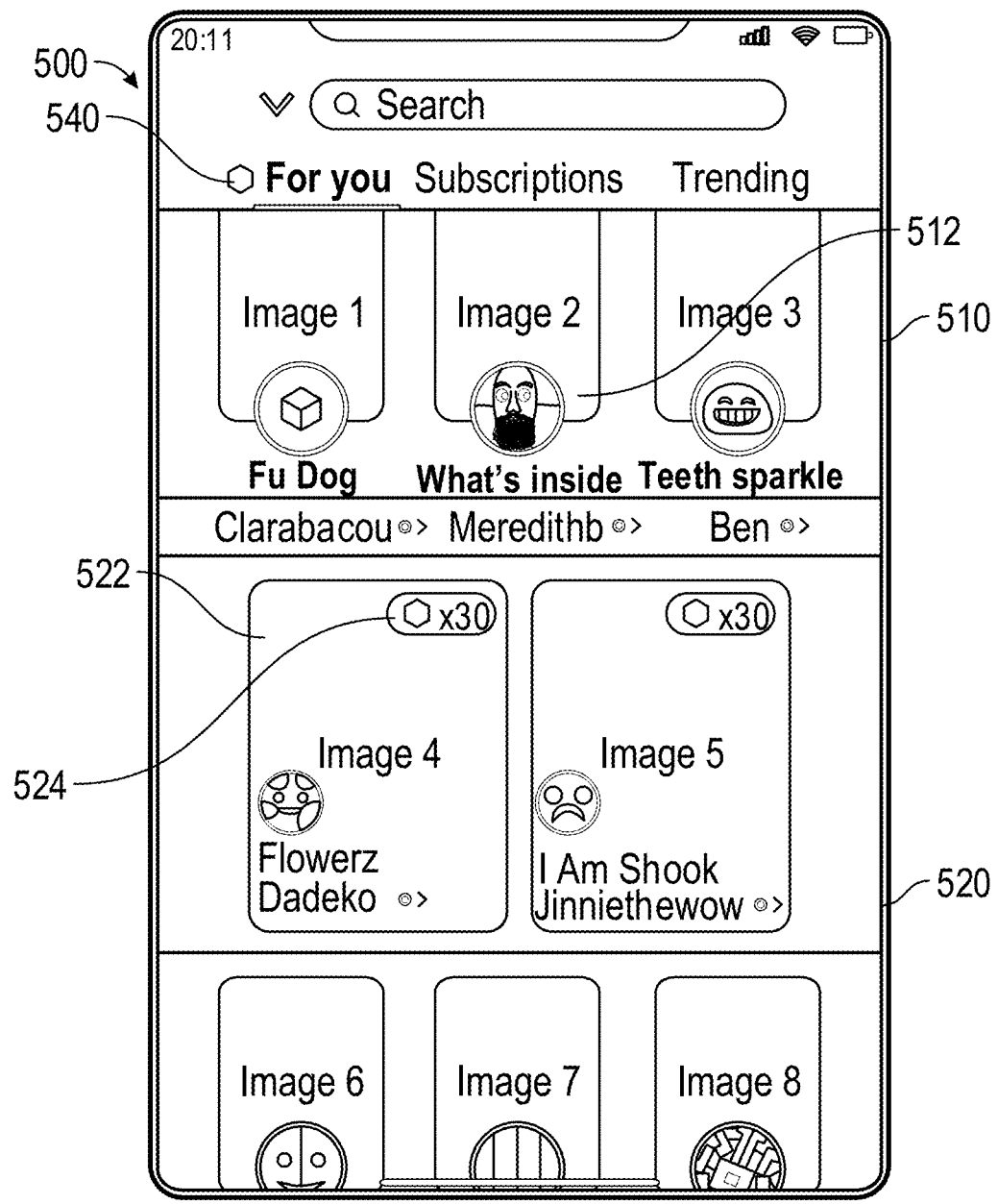
FIGS. 5A, 5B, 6, 7A, 7B, 8A, 8B, 9A, and 9B are diagrammatic representations of graphical user interfaces, in accordance with some examples.
Figure 5B:
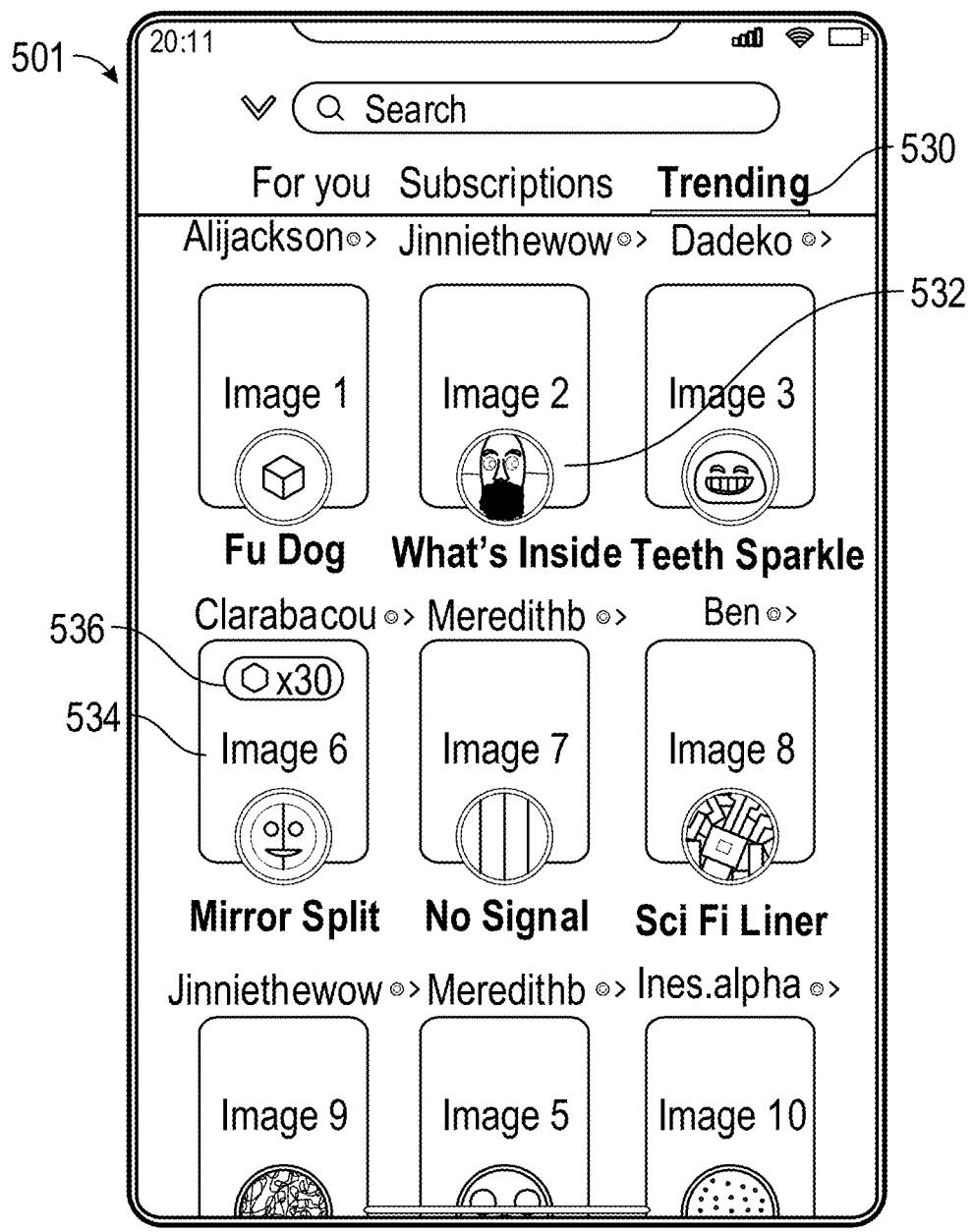

At operation 1002, the image processing server 122 retrieves a plurality of identifiers of each of the plurality of augmented reality experiences. For example, the image processing server 122 retrieves icons 532 and 534 for each of the plurality of augmented reality experiences (FIGS. 5A and 5B).

At operation 1003, the image processing server 122 determines that a given augmented reality experience of the plurality of augmented reality experiences is associated with an access restriction. For example, the image processing server 122 determines that the second icon 534 is associated with an access-restricted augmented reality experience.

At operation 1004, the image processing server 122 modifies a given identifier of the plurality of identifiers associated with the given augmented reality experience in response to determining that the given augmented reality experience is associated with the access restriction. For example, the image processing server 122 adds or includes the restriction status icon 536 that can indicate the parameters needed to remove the restriction (e.g., the restriction status icon 536 may specify a price or minimum quantity of virtual tokens needed to purchase rights to remove the restrictions from the respective access restricted augmented reality experience).

At operation 1005, the image processing server 122 generates, for display on the client device, a graphical user interface that includes the plurality of identifiers comprising the modified given identifier. For example, the image processing server 122 presents the identifiers in the manner discussed above with respect to FIGS. 5-9.

Machine Architecture

Figure 11:
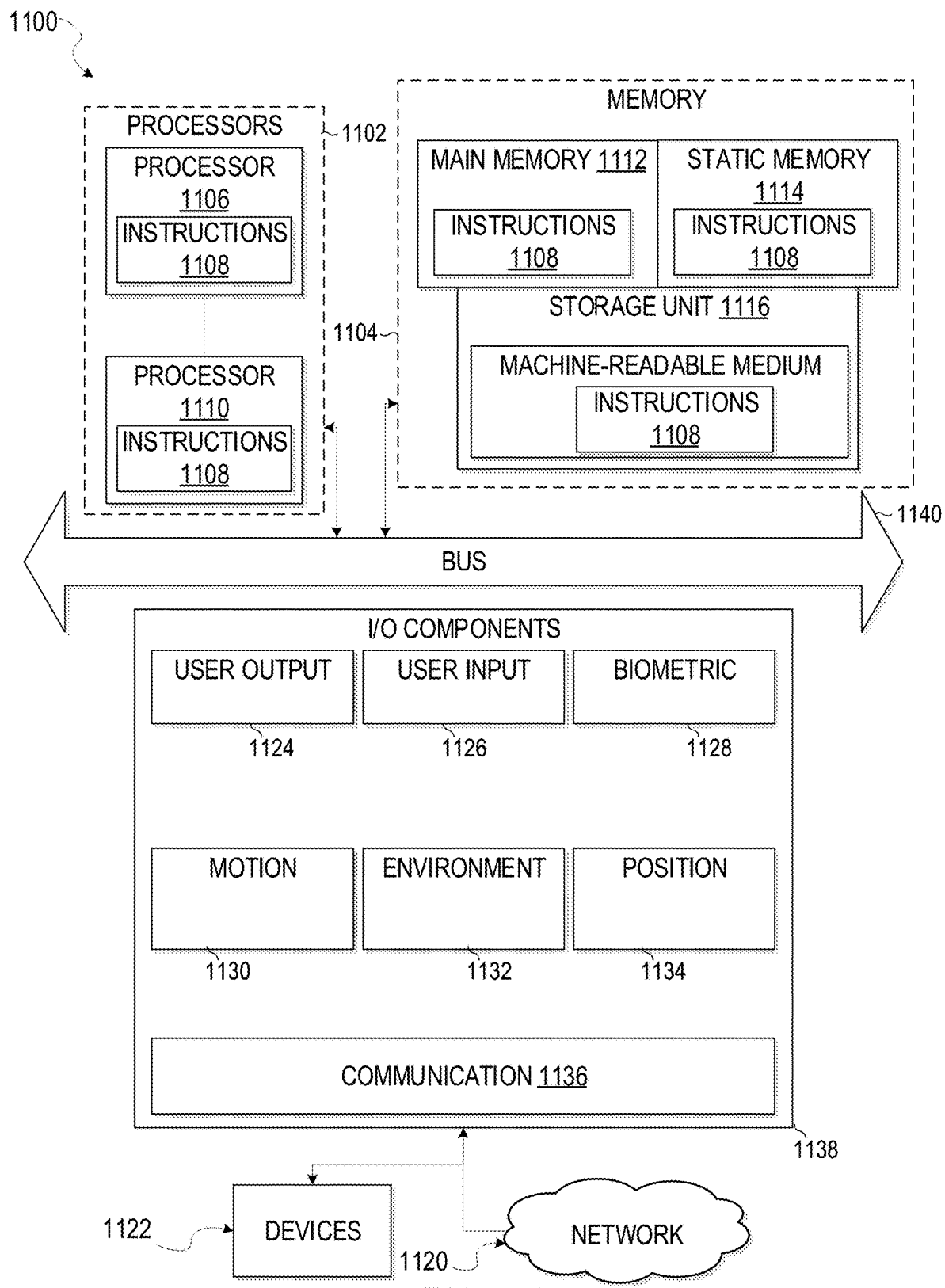
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
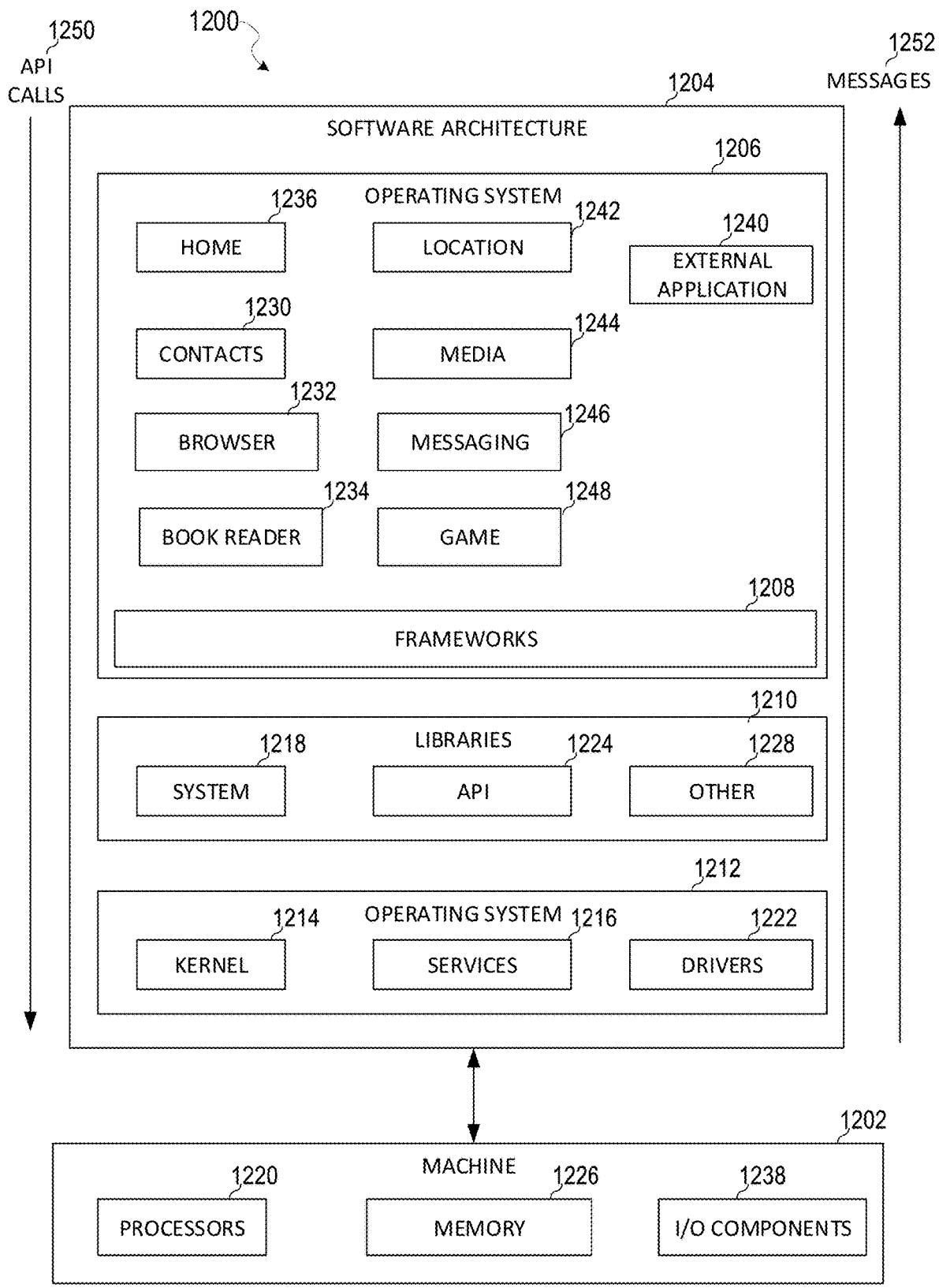
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   receiving, by a client device, a request to access a display of a plurality of augmented reality experiences;
   retrieving a plurality of identifiers of each of the plurality of augmented reality experiences;
   determining that a given augmented reality experience of the plurality of augmented reality experiences is associated with an access restriction;
   modifying a given identifier of the plurality of identifiers associated with the given augmented reality experience in response to determining that the given augmented reality experience is associated with the access restriction;
   generating, for display on the client device, a graphical user interface that includes the plurality of identifiers comprising the modified given identifier;
   receiving input associated with a preview of the given augmented reality experience that is associated with the access restriction, the given augmented reality experience being associated with a plurality of augmented reality features; and
   in response to receiving the input, generating for display the preview of the given augmented reality experience in which a subset of the plurality of augmented reality features are used to modify an image.

2. The method of claim 1, wherein each augmented reality experience of the plurality of augmented reality experiences overlays one or more augmented reality items on top of a video displayed by the client device, and wherein the access restriction comprises an electronic transaction-based restriction.

3. The method of claim 1, further comprising:
   determining that the given augmented reality experience is associated with a collection of augmented reality experiences;
   determining that a subset of the collection of augmented reality experiences is not associated with access restrictions; and
   in response to determining that the subset includes more than a threshold number of augmented reality experiences, allowing the given identifier of the given augmented reality experience to be included in the graphical user interface among the plurality of identifiers.

4. The method of claim 3, further comprising:
   in response to determining that the subset includes less than the threshold number of augmented reality experiences, preventing the given identifier of the given augmented reality experience from being included in the graphical user interface among the plurality of identifiers.

5. The method of claim 3, wherein the plurality of identifiers corresponds to the collection of the augmented reality experiences, and wherein the request comprises receiving input that selects the collection of the augmented reality experiences from a plurality of collections of augmented reality experiences.

6. The method of claim 5, further comprising:
   determining that the given augmented reality experience is associated with a popularity criterion that exceeds a popularity threshold; and
   in response to determining that the given augmented reality experience is associated with the popularity criterion that exceeds the popularity threshold, presenting the given identifier independently of the plurality of identifiers of the collection of the augmented reality experiences.

7. The method of claim 1, wherein the subset includes less than all of the augmented reality features associated with the given augmented reality experience, further comprising:
   after removing the access restriction, modifying the image based on all of the augmented reality features associated with the given augmented reality experience.

8. The method of claim 1, further comprising:
   receiving input that selects the given identifier to access the given augmented reality experience; and
   in response to receiving the input and in response to determining that the given augmented reality experience is associated with the access restriction, generating the preview of the augmented reality experience, wherein generating the preview comprises:
   displaying a video by the client device;
   obtaining one or more augmented reality items associated with the given augmented reality experience; and
   overlaying the one or more augmented reality items as static images over the video without dynamically adjusting a positioning of the one or more augmented reality items based on accelerometer and gyroscopic based measurements representing movement of the client device.

9. The method of claim 8, further comprising:
   presenting an interface for performing an electronic transaction associated with the access restriction;
   removing the access restriction associated with the given augmented reality experience in response to performing the electronic transaction; and
   after removing the access restriction, overlaying the one or more augmented reality items over the video based on accelerometer and gyroscopic based measurements representing movement of the client device.

10. The method of claim 9, further comprising:
    accessing a collection of virtual tokens associated with a user in response to receiving a request to perform the electronic transaction;
    in response to determining that the collection of virtual tokens includes a number of virtual tokens greater than a value of access restriction, completing the electronic transaction; and in response to determining that the collection of virtual tokens includes the number of virtual tokens less than the value of access restriction, presenting an interface that allows the user to purchase additional virtual tokens.

11. The method of claim 1, wherein the plurality of identifiers are presented as icons over a given video captured by the client device, and wherein modifying the given identifier comprises presenting a representation of the access restriction.

12. The method of claim 11, further comprising replacing the representation of the access restriction with a representation of the given augmented reality experience in response to determining that the access restriction has been removed.

13. The method of claim 1, further comprising:
displaying the graphical user interface in a personalized graphical user interface that includes content selected based on a user profile; and
modifying a size of the given identifier relative to a remaining portion of the plurality of identifiers.

14. The method of claim 13, wherein the remaining portion of the plurality of identifiers is presented in a first region of the graphical user interface, wherein the given identifier is presented among a plurality of restricted access identifiers of a plurality of restricted access augmented reality experiences in a second region of the graphical user interface, and wherein the plurality of restricted access augmented reality experiences are ranked relative to each other in the second region.

15. The method of claim 1, further comprising:
displaying the graphical user interface in a trending graphical user interface that includes content that is selected based on popularity; and
nesting presentation of the given identifier among a remaining portion of the plurality of identifiers, wherein the plurality of augmented reality experiences associated with the plurality of identifiers are ranked relative to each other, and wherein indication of the access restriction is presented independently of whether the access restriction has been removed for a user of the client device.

16. The method of claim 1, wherein generating the preview comprises:
obtaining one or more augmented reality items associated with the given augmented reality experience; and
overlaying the one or more augmented reality items as static images over a video without dynamically adjusting a position of the one or more augmented reality items based on movement of the client device.

17. The method of claim 1, wherein the request comprises a request to access a page that includes a plurality of restricted access identifiers of a plurality of restricted access augmented reality experiences, wherein the graphical user interface includes an introductory tile that explains how to use the restricted access augmented reality experiences, and wherein the introductory tile is removed after the page is accessed a threshold number of times or after the access restriction is removed from the given augmented reality experience.

18. The method of claim 17, further comprising:
displaying the given identifier as a first type of icon having a first size representing the given augmented reality experience in a first portion of the page dedicated for representing augmented reality experiences for which access restrictions have been removed; and
displaying the plurality of restricted access identifiers as a second type of icons having a second size representing the plurality of restricted access augmented reality experiences in a second portion of the page dedicated for representing augmented reality experiences for which access restrictions are enabled.

19. A system comprising:
a processor configured to perform operations comprising:
receiving, by a client device, a request to access a display of a plurality of augmented reality experiences;
retrieving a plurality of identifiers of each of the plurality of augmented reality experiences;
determining that a given augmented reality experience of the plurality of augmented reality experiences is associated with an access restriction;
modifying a given identifier of the plurality of identifiers associated with the given augmented reality experience in response to determining that the given augmented reality experience is associated with the access restriction;
generating, for display on the client device, a graphical user interface that includes the plurality of identifiers comprising the modified given identifier;
receiving input associated with a preview of the given augmented reality experience that is associated with the access restriction, the given augmented reality experience being associated with a plurality of augmented reality features; and
in response to receiving the input, generating for display the preview of the given augmented reality experience in which a subset of the plurality of augmented reality features are used to modify an image.

20. A non-transitory machine-readable storage medium that includes instructions that, when executed by one or more processors of a machine, cause the machine to perform operations comprising:
receiving, by a client device, a request to access a display of a plurality of augmented reality experiences;
retrieving a plurality of identifiers of each of the plurality of augmented reality experiences;
determining that a given augmented reality experience of the plurality of augmented reality experiences is associated with an access restriction;
modifying a given identifier of the plurality of identifiers associated with the given augmented reality experience in response to determining that the given augmented reality experience is associated with the access restriction;
generating, for display on the client device, a graphical user interface that includes the plurality of identifiers comprising the modified given identifier;
receiving input associated with a preview of the given augmented reality experience that is associated with the access restriction, the given augmented reality experience being associated with a plurality of augmented reality features; and
in response to receiving the input, generating for display the preview of the given augmented reality experience in which a subset of the plurality of augmented reality features are used to modify an image.

\* \* \* \* \*